May 5, 1970   E. P. AGHNIDES   3,509,928
TUBELESS TIRE WITH SUPPLEMENTAL SUPPORT
Filed Oct. 18, 1967   3 Sheets-Sheet 1

INVENTOR
Elie P. Aghnides
BY Hall, Pollock & Vande Sande
ATTORNEY

May 5, 1970 E. P. AGHNIDES 3,509,928
TUBELESS TIRE WITH SUPPLEMENTAL SUPPORT
Filed Oct. 18, 1967 3 Sheets-Sheet 2
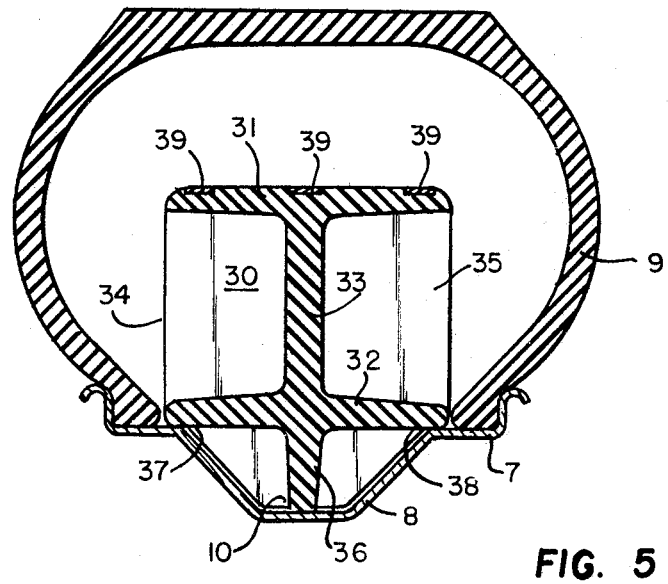
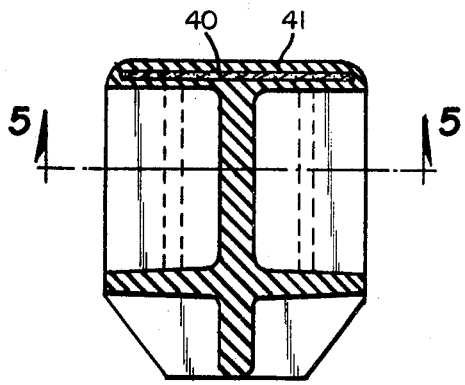
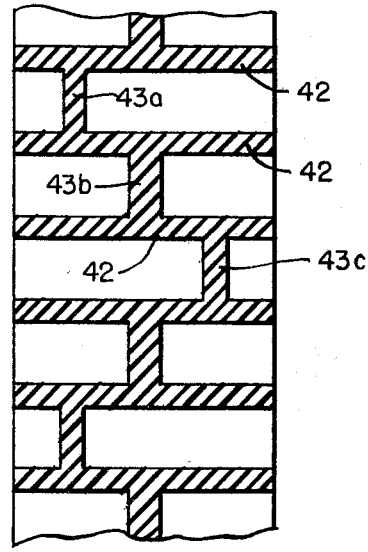
INVENTOR
Elie P. Aghnides
BY Hall, Pollock & Vande Sande
ATTORNEY INVENTOR
Elie P. Aghnides
BY Hall, Pollock & Vande Sande
ATTORNEY though the vehicle then continues to run upon the deflated tire, adequate support is provided for the load to enable the vehicle to continue its travel, perhaps at reduced speed, and there is a reduced likelihood that the tire 9 will become separated from the rim 7 of the wheel.

3,509,928
TUBELESS TIRE WITH SUPPLEMENTAL SUPPORT
Elie P. Aghnides, 795 5th Ave., New York, N.Y. 10021
Continuation-in-part of application Ser. No. 342,884, Feb. 6, 1964. This application Oct. 18, 1967, Ser. No. 676,200
Int. Cl. B60c 17/04
U.S. Cl. 152—158      7 Claims

ABSTRACT OF THE DISCLOSURE

The disclosure relates to a tubeless tire and rim arrangement having an insert for the tubeless tire which is adapted to support the load in the event that the air leaks out of the tire. The insert is formed of an elastic material of a generally annular configuration, with its inner wall contacting either the rim or the inner wall of the tire adjacent the bead thereof, and the insert may be provided with one or more webs formed of a material such as fiberglass or steel mesh which is embedded within the plastic material of the insert in order that it shall retain its shape and size when the tire rotates at high speeds.

CROSS REFERENCE TO RELATED APPLICATION

This application is a continuation-in-part of my copending application Ser. No. 342,884, filed Feb. 6, 1964, for "Tubeless Tire With Supplemental Support," now Pat. No. 3,367,381, issued Feb. 6, 1968.

BACKGROUND OF THE INVENTION

Blowouts at high speeds have always been dangerous, and while the invention of the tubeless tire has decreased the danger it has not eliminated it. Moreover, it is not desirable to drive short distances on tubeless tires that have become flat. It is a primary object of this invention to overcome these inadequacies of the prior art tubeless tires. It is another object of the invention to provide a tubeless tire with more strength than those of the prior art and also to provide a supplemental rolling support for a tubeless tire which is effective in the event the tubeless tire loses its air. It is another feature of the invention to reduce the likelihood of punctures in tubeless tires, and to provide a supplemental support for tubeless tires of the kind described which can be sold separately from the tire and readily inserted by one who desires to have its advantages.

SUMMARY OF THE INVENTION

The invention in its broader aspects relates to a supplemental ring-shaped elastic element whose inner periphery is adjacent or in engagement with the rim or the inner wall of the tire adjacent the rim, i.e., at or near the tire's bead. The ring-shaped elastic element is preferably strong enough to hold the rim of the wheel well above the road in case of a blowout at high speeds and is strong enough to enable the car to be driven to a safe place off the road or to a repair station. The ring-shaped element may be provided with one or more ring-shaped bands of a material of high tensile strength such as fiberglass or wire mesh, or the like which may be embedded within the elastic material of which the supplemental elastic element is formed in order that it shall retain its proper circular shape when the vehicle is operated at high speed.

BRIEF DESCRIPTION OF THE DRAWINGS

In describing the invention, reference will be made to the accompanying drawings in which:

FIG. 3 is a cross-sectional view of a further modification of the invention;

FIG. 4 illustrates a cross-sectional view of a further modification of the invention;

FIG. 5 is a cross-sectional view taken along section line 5—5 of FIG. 4;

DESCRIPTION OF THE PREFERRED EMBODIMENTS

In FIGS. 1 through 8, the invention is shown in conjunction with a standard automobile wheel having a conventional rim 7, the periphery 8 of which is concave in the usual way. The pneumatic tubeless tire 9 is conventional insofar as its normal association with the rim 7 is concerned, and it is also conventional insofar as its external configuration is concerned. The relatively flat, ground-contacting or lower surface of the tire 9 has treads in the usual manner. In short, everything about the wheel, rim, and tire may be conventional except for the internal supplemental support which will be now described.

Figure 1:
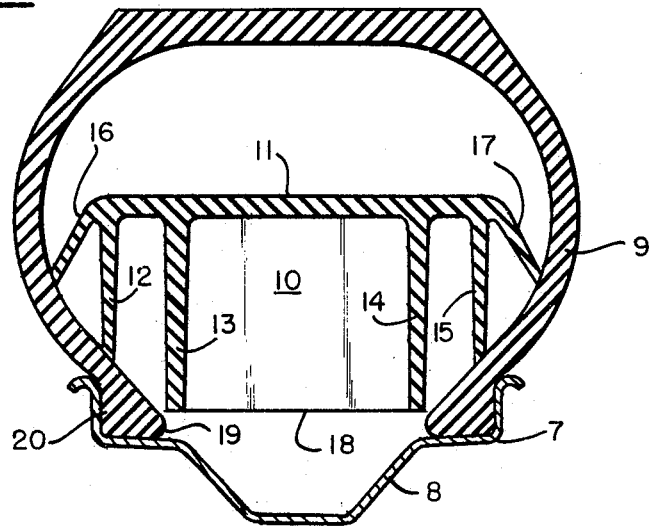
FIG. 1 is a cross-sectional view of a tire and rim combination embodying one form of the invention.

In FIG. 1, the supplemental support 10 comprises a ring-shaped portion 11 and integral annular, spaced walls 12, 13, 14, and 15, each of which lies substantially in the plane of the wheel and tire combination. Integral walls 16 and 17 are also provided which slant outwardly relative to the plane of the wheel so as to contact the inner wall of the tire. It will be noted that a plurality of circumferentially spaced supporting walls 18 join the two inner spaced walls 13 and 14 at a plurality of places about the circumference of the insert 10, and the function of these walls 18 is to provide strength for the insert 10 so that it can properly support the load on the wheel in the event that the tire 9 becomes partially or wholly deflated.

Under normal conditions, when the tire 9 is suitably inflated, the insert 10 merely rides in place in the manner shown in FIG. 1 and the tire and wheel combination performs in the usual manner. However, in the event that the tire 9 becomes partially or wholly deflated as by a puncture or the like, the load is then supported by the insert 10, and it can be appreciated that this load causes the various annular walls 12 through 17 to exert a force against the side walls of the tire tending to maintain its bead 19 in close contact with the edge 20 of rim 7. As a result, even though the vehicle then continues to run upon the deflated tire, adequate support is provided for the load to enable the vehicle to continue its travel, perhaps at reduced speed, and there is a reduced likelihood that the tire 9 will become separated from the rim 7 of the wheel.

Figure 2:
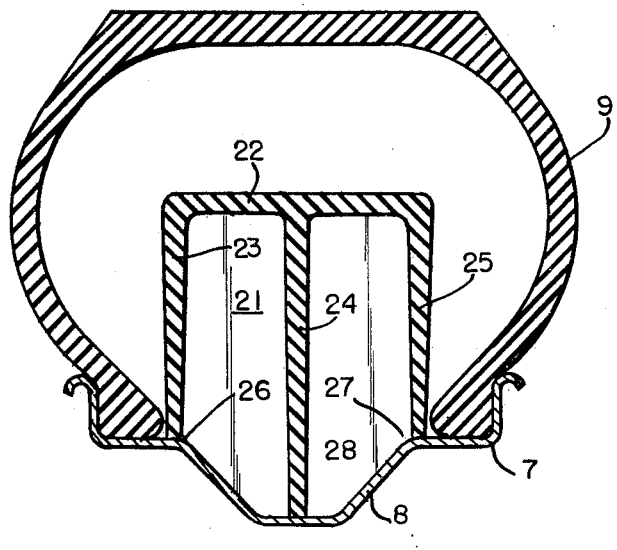
FIG. 2 is a cross-sectional view of a tire and rim arrangement together with a supplementary ring-shaped elastic element comprising a modification of that shown in FIG. 1.

In the embodiment of FIG. 2, the insert 21 comprises a ring-shaped portion 22 which is integrally joined to a plurality of parallel annular portions 23, 24, and 25. The inner circular wall of each of these portions abuts the rim 7, with the portions 23 and 25 being of somewhat larger diameter than the middle portion 24 so that the portions 23 and 25 will abut the inner surface of the rim at points 26 and 27 where the rim is of larger diameter, whereas the inner wall of the mid-portion 24 will abut the rim at 28 where the rim is of its smallest diameter.

In the embodiment of FIG. 3, the insert 30 is generally of an H-shaped configuration comprising portions 31 and 32 which are each generally ring-shaped and perpendicular to the axis of the wheel and joined by the annular-shaped portion 33. A plurality of supporting walls 34 and 35 are spaced circumferentially about the insert 30 and at each of their locations join the portions 31, 32 and 33 to provide extra rigidity so as to enable the insert to support the load of the vehicle in the event the tire becomes partially or wholly deflated. The insert is further provided with a protruding annular portion 36 which extends inwardly toward the center of the wheels from the member 32 and abuts against the inner surface of the rim 7 at 10. The insert 30 is thus supported in part by the fact that the ring-shaped member 32 rests upon the rim walls at 37 and 38 and in part by the inwardly extending angular portion 36 which abuts the rim at 10.

It has been discovered that inserts for tubeless tires of the kind described herein tend to become deformed and wobble badly at high speeds, thereby causing excessive vibration and producing damage to the insert and also to the associated tubeless tire. FIG. 3 discloses a means for preventing this from happening, and this means comprises one or more annular bands 39 which may be formed of a material of high tensile strength (greater than that of which the insert is formed) while still retaining flexibility, such as fiberglass or wire mesh, or the like, and these bands 39 are shown in FIG. 3 as being placed about the outermost surface of portion 31. These bands 39 thus effectively encircle the insert 30 and prevent it from losing its shape and expanding when the wheel and tire are rotated at high speed.

FIG. 4 illustrates a modification of the insert of FIG. 3, in which, for one thing, a single wider band 40 of fiberglass or steel mesh, or the like, is used instead of the plurality of bands 39 of FIG. 3. Moreover, the band 40 is embedded within the elastic material forming the portion 41. Another feature of the embodiment of FIG. 4 is illustrated in the cross-sectional view of FIG. 5 which shows that the insert is provided, in effect, with a honeycomb-like structure, being divided by a plurality of transverse walls 42 which are joined by walls 43a, 43b and 43c, with the latter walls being in staggered relationship to provide increased structural strength for the insert of this embodiment.

Figure 6:
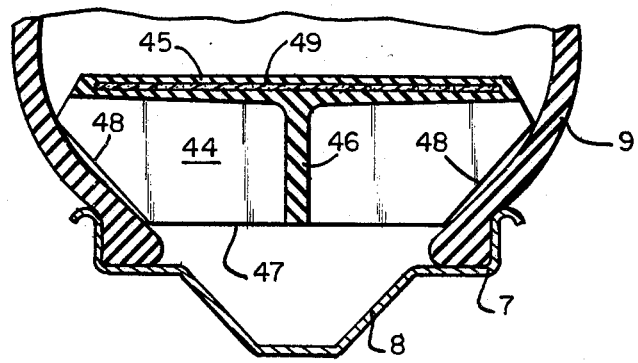
FIG. 6 illustrates a cross-sectional view of a further modification of the invention comprising a band or ring of a high tensile strength material embedded within the elastic material of the supplemental ring member.

In the embodiment of FIG. 6, the insert 44 comprises a ring-shaped portion 45 which is joined to an annular portion 46. A plurality of transverse walls 47 are circumferentially spaced about the insert 44 to provide a plurality of adjoining compartments. The outwardly and downwardly extending walls 47 are provided with edges 48 which are so contoured as to effectively abut the inner side wall of the tire 9 adjacent the rim 7. Thus, in the event of a deflation of tire 9, causing the vehicle load to be borne by the insert 44, the load is transmitted to the rim 7 through the transverse walls 47 each of which bears against the side walls of the tire 9. It will be noted that the ring-shaped portion 45 is provided with an embedded insert 49 which again may be formed of fiberglass, wire mesh, or other suitable material so as to aid in maintaining the shape of the insert 44 under high speed conditions.

Figure 7:
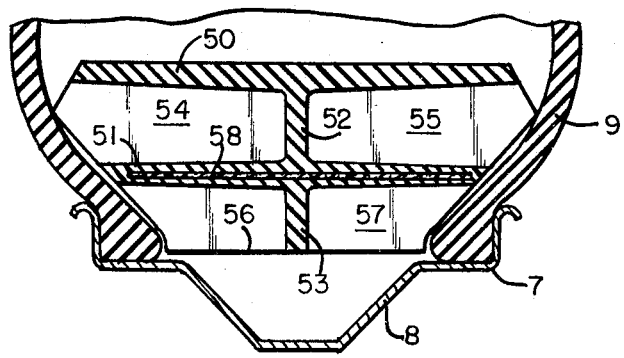
FIG. 7 is a cross-sectional view of a modification of the form of the invention shown in FIG. 6.

The embodiment of FIG. 7 is similar to that of FIG. 6 with the principal difference being that two ring-shaped portions 50 and 51 are provided, and these are joined by an annular portion 52. A further inwardly extending annular portion 53 is also provided, and the insert is divided into successive compartments by the circumferentially spaced dividing walls 54, 55, 56 and 57. As in the embodiment of FIG. 6, the load of the vehicle in the event of deflation of tire 9 is transmitted to rim 7 through the outwardly and downwardly extending edges of the dividing walls 54–57. The ring-shaped portion 51 is provided with an embedded ring-shaped element 58 formed of a high tensile strength material as previously described in connection with some of the preceding embodiments.

Figure 8:
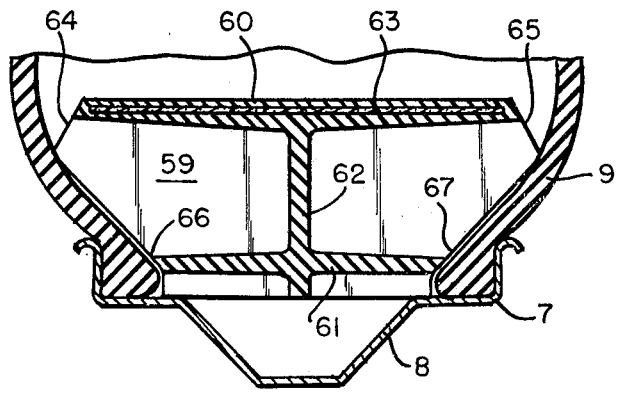
FIG. 8 is a cross-sectional view of a further modification of the invention similar to the forms shown in FIGS. 6 and 7.

The embodiment of FIG. 8 also includes an insert 59 having two ring-shaped portions 60 and 61 which are joined by an annular member 62. The ring-shaped portion 61 is provided with an embedded ring 63 of fiberglass, wire mesh, or the like, and the space occupied by the insert is divided by a plurality of circumferentially spaced dividing walls 64 and 65 which provide added structural strength and rigidity to the insert. In the event of deflation of tire 9, the load is transmitted to the rim 7 through the downwardly and outwardly extending edges of the dividing walls 64 and 65 and also by the ring-shaped member 61 which bears against the inner side walls of the tire at 66 and 67.

Having described a number of embodiments of an insert for a tubeless tire and wheel arrangement which are particularly adapted to provide safe and continued operation of the vehicle in the event of a failure of the tubeless tire to hold air, I wish it to be understood that various modifications and alterations may be made to the specific forms of my invention as shown herein without departing from the spirit or scope of my invention.

What I claim is:

1. In a wheel and tubeless tire combination:
   a wheel having a rim,
   a tubeless pneumatic tire fitting said rim,
   said tire comprising elastic material having an inner wall,
   an insert for said tire comprising a ring of elastic material extending from a position adjacent the felloe of said rim to a position adjacent to but substantially spaced from the inner wall of the tire for providing support for the wheel in the event the tire loses its air,
   said elastic ring insert having sufficient rigidity to support the normal load of the tire without collapsing,
   said insert comprising an outer ring-shaped portion having an outer wall of substantially less diameter than the inner wall of the tire, and an inner ring-shaped portion having a diameter substantially less than that of said outer portion, and means dividing the space between said inner and outer portions into a honeycomb of separate chambers,
   said last-named means comprising a plurality of circumferentially spaced dividing walls each generally parallel to the axis of the wheel and a plurality of segmental walls generally parallel to the plane of the wheel and disposed in a generally staggered relationship between successive of said dividing walls.

2. An insert for a wheel and tubeless tire combination which includes:
   a wheel having a rim and
   a tubeless pneumatic tire of elastic material and having an inner wall which fits the rim,
   said insert comprising a ring of elastic material extending from a position adjacent the felloe of the rim to a position adjacent to but substantially spaced from the inner wall of the tire for providing support for the wheel in the event the tire loses its air,
   said elastic ring insert having sufficient rigidity to support the normal load of the tire without collapsing,
   said insert comprising two ring-shaped portions and with the diameter of the outer ring being such that its outer wall is spaced from the inner wall of the tire when said tire is inflated,
   at least one annular portion extending inwardly from the inner wall of the outer of said ring-shaped portions, and joining said two ring-shaped portions,
   the space between said ring-shaped portions being divided by a plurality of circumferentially-spaced radially-extending walls which are integral with said ring-shaped portions and with said annular portions.

3. An insert for a wheel and tubeless tire combination which includes:
- a wheel having a rim and
- a tubeless pneumatic tire of elastic material and having an inner wall which fits the rim,
- said insert comprising a ring of elastic material extending from a position adjacent the felloe of the rim to a position adjacent to but substantially spaced from the inner wall of the tire for providing support for the wheel in the event the tire loses its air,
- said elastic ring insert having sufficient rigidity to support the normal load of the tire without collapsing,
- said insert comprising at least one ring-shaped portion of such a diameter that its outer wall is spaced from the inner wall of the tire when said tire is inflated, at least one annular portion extending radially inward from the inner wall of said ring-shaped portion, the space inwardly of said ring-shaped portion being divided by a plurality of circumferentially spaced radially extending walls which are integral with said ring-shaped portion and said annular portion,
- at least some of said annular portions extending inwardly from said ring-shaped portion at an acute angle to the plane of the tire so that their inner edges bear against the side walls of the tire adjacent the rim.

4. In a wheel and tubeless tire combination:
- a wheel having a rim,
- a tubeless pneumatic tire fitting said rim,
- said tire comprising elastic material having an inner wall,
- an insert for said tire comprising a ring of elastic material extending from a position adjacent the felloe of said rim to a position adjacent to but substantially spaced from the inner wall of the tire for providing support for the wheel in the event the tire loses its air,
- said elastic ring insert having sufficient rigidity to support the normal load of the tire without collapsing,
- said insert comprising at least an outer ring-shaped portion of such a diameter that its outer wall is spaced from the inner wall of the tire when said tire is inflated, and an inner ring-shaped portion, at least one annular portion extending radially between said ring-shaped portions, the space between said ring-shaped portions being divided by a plurality of circumferentially spaced walls,
- at least one of said ring-shaped portions including at least one ring-shaped band formed of a material of substantially greater tensile strength than the elastic material of which said insert is formed.

5. The combination of claim 4, in which said band is embedded within the elastic material of which said ring-shaped portion is formed.

6. The combination of claim 4 in which at least one of said annular portions extends inwardly so as to bear against the felloe of said rim.

7. The combination of claim 4 in which said annular inwardly extending portions are substantially parallel and bear at their inner edges against the felloe of said rim.

References Cited

UNITED STATES PATENTS

| | | | |
|---|---|---|---|
| 2,242,788 | 5/1941 | Marks | 152—158 |
| 2,262,780 | 11/1941 | Sherwood | 152—158 |
| 2,308,959 | 1/1943 | Brink | 152—158 |
| 3,025,898 | 3/1962 | Opel | 152—158 |
| 3,250,310 | 5/1966 | Johnson | 152—158 |
| 3,049,162 | 8/1962 | Rosenbaum et al. | 152—158 |

FOREIGN PATENTS

| | | |
|---|---|---|
| 962,439 | 6/1950 | France. |
| 541,988 | 10/1955 | Belgium. |
| 999,831 | 2/1952 | France. |

ARTHUR L. LA POINT, Primary Examiner

C. B. LYON, Assistant Examiner